United States Patent [19]

Parker et al.

[11] Patent Number: 5,653,946
[45] Date of Patent: Aug. 5, 1997

[54] PROCESS FOR FLUIDIFYING AQUEOUS SUSPENSIONS OF RED MUDS IN THE PRODUCTION OF ALUMINA BY THE BAYER PROCESS

[75] Inventors: Adrian Parker, Cleck Heaton, Great Britain; René Pich, Saint Etienne, France

[73] Assignee: S.N.F., France

[21] Appl. No.: 275,034

[22] Filed: Jul. 14, 1994

[30] Foreign Application Priority Data

Jul. 29, 1993 [FR] France .................. 93 09584

[51] Int. Cl.$^6$ .................. B01D 21/01
[52] U.S. Cl. .......... 423/121; 209/51; 210/701; 210/728; 210/734; 423/122; 423/130; 423/131
[58] Field of Search ................ 209/5; 210/701, 210/725, 727, 728, 733, 734; 423/111, 121, 122, 130, 131

[56] References Cited

U.S. PATENT DOCUMENTS

| | | | |
|---|---|---|---|
| 3,975,496 | 8/1976 | Smalley et al. | 422/122 |
| 4,083,925 | 4/1978 | Green et al. | 423/121 |
| 4,169,824 | 10/1979 | Kane | 423/111 |
| 4,545,902 | 10/1985 | Connelly et al. | 423/122 |
| 5,008,089 | 4/1991 | Moody et l. | 210/730 |
| 5,043,077 | 8/1991 | Chandler et al. | 210/698 |
| 5,217,620 | 6/1993 | Mahoney et al. | 210/730 |
| 5,387,405 | 2/1995 | Connelly et al. | 423/122 |

FOREIGN PATENT DOCUMENTS

| | | |
|---|---|---|
| 819040 | 7/1969 | Canada . |
| 2430792 | 2/1980 | France . |
| 1767422 | 9/1971 | Germany . |
| 2080272 | 2/1982 | United Kingdom . |

OTHER PUBLICATIONS

Bauxite (Proc. Bauxite Symp. 1984) 1984, Ed.: Jacobs et al., pp. 788–810, M.J. Pearse et al. "Application of Special Chemicals (Flocculants and dewatering aids for Red Mud Separation and Hydrate Filtration"p. 780; pp. 798–799.

Light Metals 1986 1988, Warrendale (US) pp. 61–68, L.J. Connelly et al. "Synthetic Flocculant Technology in the Bayer Process", p. 62.

Database WPI, Section Ch, Week 8225, Derwent Publications, Ltd., London, GB; Class J01, AN 82–51474E & JP–A–57 078 911 (Kurita Water Ind) 17 May 1982.

*Primary Examiner*—Peter A. Hruskoci
*Attorney, Agent, or Firm*—Harris Beach & Wilcox

[57] ABSTRACT

Improved process for fluidifying flocculated aqueous suspensions of red muds in the production of alumina from bauxite by the Bayer process, which consists:
in dissolving bauxite using sodium hydroxide;
then, in decanting and in washing the red muds formed in order to separate them from the alumina in successive vats, while recycling the washing waters upstream;
and finally, in eliminating the red muds thus treated;
and in which a flocculant (F) consisting of a polyacrylamide of molecular weight greater than ten million is introduced into the suspension of one of the successive vats;
wherein a dispersing agent (D) formed by an anionic acrylic acid polymer of molecular weight lower than fifty thousand is added simultaneously with said flocculant (F) to the suspension in the same vat.

9 Claims, 4 Drawing Sheets

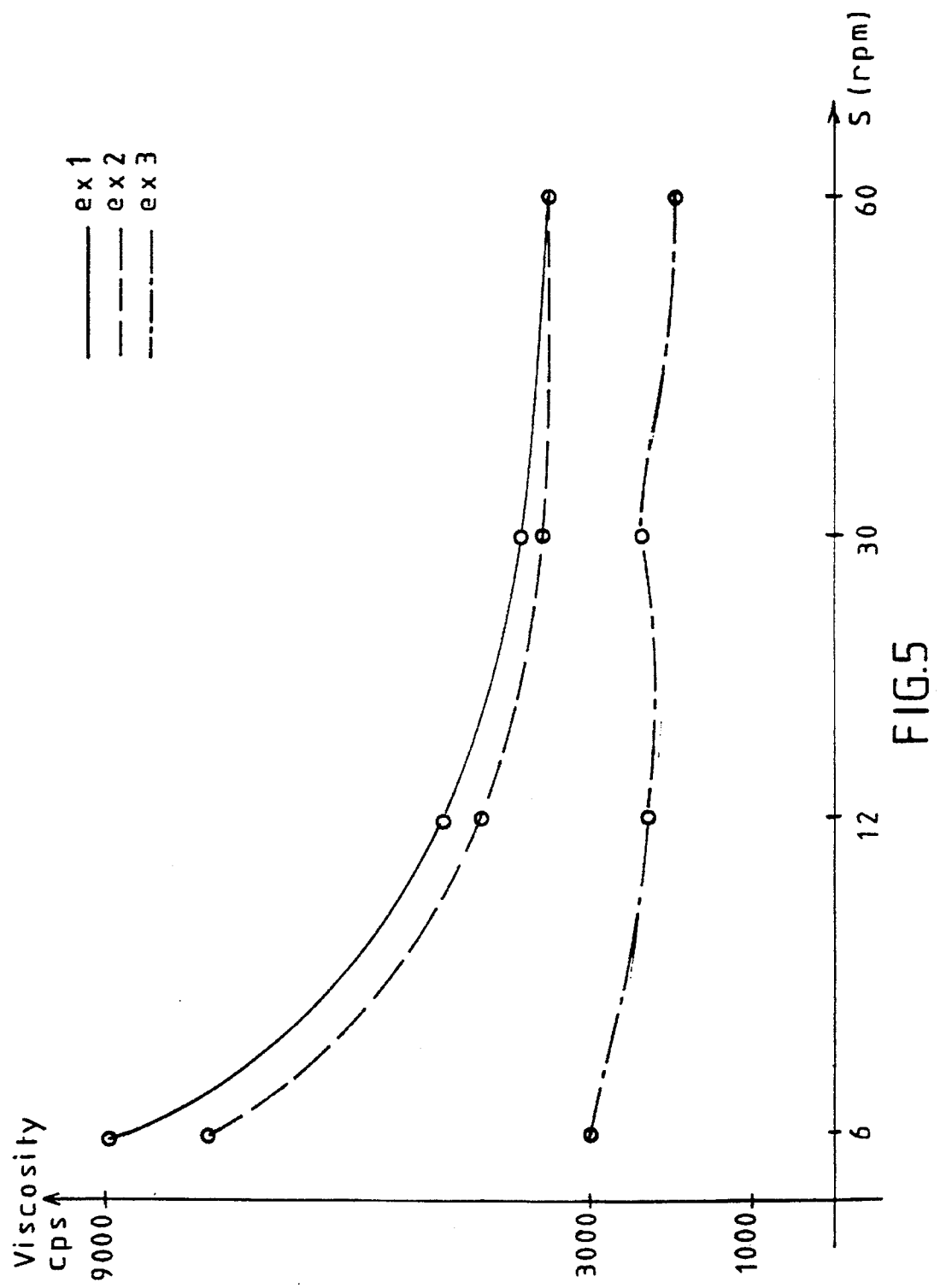

PROCESS FOR FLUIDIFYING AQUEOUS SUSPENSIONS OF RED MUDS IN THE PRODUCTION OF ALUMINA BY THE BAYER PROCESS

BACKGROUND OF THE INVENTION

The invention relates to an improved process for fluidifying flocculated aqueous suspensions of red muds in the production of alumina by the Bayer process.

The Bayer process for the production of alumina from bauxite has long been known. It is thus unnecessary to describe it here in detail. Essentially, this technique consists first of all in placing bauxite and sodium hydroxide together, under pressure and at a given temperature, and then in decanting the liquor obtained in the presence of a flocculant (F) which is generally anionic, in order to recover the alumina, on the one hand, and a strongly basic liquor of red muds, on the other hand. As is known, these red muds must be eliminated. At the same time, the sodium hydroxide must be recovered. To do this, these liquors are decanted and washed in successive vats (two to ten according to the installations), where these liquors which have been washed by the preceding liquor are stirred and recycled countercurrent. The sodium hydroxide concentration is thus gradually brought from an initial content of 200 to 300 g/liter to a final content in the region of ten grams per liter. Simultaneously, the concentration of red muds is gradually brought within the region of 40 to 50% dry solids content. However, the presence in these liquors of the flocculant (F) increases the concentration of red muds, which then become increasingly difficult to convey by pumping to the elimination site, often referred to as the "lake" or "lagoon".

In the document CA-A-819,040, corresponding to the document DE-A-1,767,422, in order to facilitate the decantation of these highly viscous suspensions it has been proposed to add to the decantation vats a flocculant mixture comprising starch and a copolymer of acrylamide and sodium acrylate of molecular weight greater than 50,000, preferably of the order of ten million. This technique, which favors the decantation, unfortunately increases the viscosity of the suspensions, which then become more difficult to pump.

In the document U.S. Pat. No. 4,169,824, corresponding to the document FR-A-2,430,792, it has been proposed, after the final washing step, to add to the liquor of flocculated red muds which is intended to be eliminated, a dispersing agent (D) based on an acrylic acid polymer, in particular a methyl methacrylate polymer, of molecular weight between 5,000 and 30,000, and this in a proportion of 50 grams per tonne (50 g/t) of dry red muds. In this way, the viscosity of the final solution of the muds is lowered, the latter becoming more fluid and thus able to be pumped in existing installations, and consequently conveyed to the point of final elimination. Although this approach gives excellent results, it remains expensive to implement on the whole, because it is necessary to use appreciable amounts of dispersing agent (D). In addition, this approach does not resolve the problem of the decantation itself, or the poor flow of these viscous muds.

Moreover, the injection of a dispersing agent (D) immediately after the final washing, but before the pump, requires the use of a specific additional dispersion material, and requires the evacuation tubing and pumps to be reinforced, which increases the investment cost. In addition, for a given concentration of muds, this decreases the pumping efficiency. Finally, the mixing being carried out in the connecting tubing just before the pump is performed in a very short space of time, which is far from being ideal in order to ensure a good homogeneity of the medium to be pumped.

In document U.S. Pat. No. 5,043,077, it has been suggested to add a mixture containing leonardite to the final dilution vat. This diluent is added in an appreciable amount (from 0.1 to 10% relative to the amount of dry muds). This requires the addition of the suitable material, and consequently increases the investment cost. Since a solid material is added, the latter will affect the subsequent pumping efficiency. Finally, the use of this very specific diluent sometimes brings about precipitation by agglomeration around this compound. This is no doubt the reason for which this technique has barely been developed.

In order to accelerate this decantation, it has been suggested in the document GB-A-2,080,272 to use a mixture of two flocculants (F), introduced in series preferably in the latter stages of the treatment, namely an emulsion of sodium polyacrylate and a polyacrylamide, both of molecular weight between five and ten million.

This process also has the same disadvantages as the above processes in which a single flocculant is used, in particular as regards the pumping difficulties.

SUMMARY OF THE INVENTION

The invention overcomes these disadvantages. Its target is a process for fluidifying aqueous suspensions of red muds in the production of alumina by the Bayer technique, which process is easy to implement and makes it possible efficiently to decrease the final viscosity of these muds, which are intended to be pumped and then conveyed until they are eliminated, while at the same time being compatible with the actual theology of these muds, and without modification of existing installations, thus without any significant additional investment.

This improved process for fluidifying flocculated aqueous suspensions of red muds in the production of alumina from bauxite by the Bayer process consists:

in dissolving bauxite using sodium hydroxide;
then, in decanting and in washing the red muds formed in order to separate them from the alumina in successive vats, while recycling the washing waters upstream;
and finally, in eliminating the red muds thus treated;
in which process a flocculant (F) consisting of a polyacrylamide of molecular weight greater than ten millions is introduced into the suspension of one of the successive vats; wherein a dispersing agent (D) formed by an anionic acrylic acid polymer of molecular weight lower than fifty thousand is added simultaneously with said flocculant (F) to the suspension in the same vat.

In other terms, the invention consists in selecting a specific mixture of flocculant (F) and dispersing agent (D) and in introducing this mixture, not separately just before the pumping and after the decantation as was performed hitherto, but, on the contrary, together and during the actual decantation cycle. Surprisingly, by working with this specific mixture which is introduced during the decantation, the viscosity of the suspension is decreased while increasing its concentration of muds; moreover, this suspension remains perfectly pumpable and conveyable in existing installations, until these muds are definitively eliminated.

In other words, the invention consists in causing a specific mixture of dispersing agent D and a flocculant F to act simultaneously and throughout the washing-decantation cycle. It is well known that the use of a flocculant (F) results in concentration and thickening of the suspension treated whereas, on the other hand, the use of a dispersing agent (D)

brings about dilution and fluidification of the same suspension. Thus, from common sense one would not be led to mixing these two products which are known for diametrically opposed effects. On the other hand, the choice of a specific flocculant (F) and a specific dispersing agent (D), introduced together into one of the vats for decantation of the suspension, shows, against all expectations, advantageous and totally unanticipated results. The concentrating effect of the flocculant (F) and the diluting effect of the dispersing agent (D) do not cancel each other out but, on the contrary, cooperate to give a new, unexpected result.

Thus, the process according to the invention, which consists in incorporating a flocculant F and a dispersing agent D at the same time during the decantation, in order to allow a better decantation of the muds, a better thickening and a better pumping, required a definite prejudice to be overcome, since it consists in employing a specific mixture of compounds which have antagonistic effects.

As it is known, the addition of the flocculant (F) favors formation of the floc with bauxite. On the other hand, the dispersing agent (D), which is introduced simultaneously, inserts itself homogeneously into and around the flocs progressively as they are formed to avoid their compacting or their caking, which decreases the viscosity of the medium by virtue of the repulsive effects of the $COO^-$ groups of each dispersant compound (D) imprisoned within the floc. Thus, the addition of the dispersant agent (D) avoids the compacting of the flocs and permits to maintain the suspension with individual flocs. As in other respects, the medium is strongly anionic in consequence of the presence of the dispersant agent (D), the flocs are subject to repulsive effects which maintain them under their individual form.

This process is advantageously suited to the treatment of red muds at dry mud concentrations between 2 and 750 grams/liter.

In practice:
- the polyacrylamide (flocculant F) is anionic and has a molecular weight greater than ten million, preferably between fifteen and twenty five million; polyacrylamides in the form of solutions may be used, but powders to be dissolved at the time of use are preferably employed;
- the polyacrylamide is at least 10% anionic, preferably 20–100%, that is to say that it has an anionicity between 20 and 100 mol per cent; the polyacrylamide may be an acrylic acid homopolymer, an acrylamide copolymer, or even a terpolymer, and preferably linear;
- the acrylic acid polymer (dispersing agen D) is preferably a sodium polyacrylate, of molecular weight between five hundred and fifty thousand, preferably between one thousand and ten thousand; it has been observed that the efficiency is reduced if the molecular weight is less than five hundred or if it exceeds fifty thousand; it has also been observed that better results were obtained when this molecular weight has a low Guassian distribution, that is to say when its polydis-persity is low, generally less than 3;
- in one preferred variant, a potassium, calcium or ammonium acrylate is employed in order not to overload the medium with sodium hydroxide; in another variant, polyacrylic acid is added to the medium which, on reacting with the sodium hydroxide present, then forms the desired dispersing agent D in situ;
- in the characteristic mixture, the ratio between the amount by weight of flocculant F (polyacrylamide) and the amount by weight of dispersing agent D (polyacrylate) is between 0.1 and 5 and is preferably in the region of one;
- the mixture of flocculant F and dispersing agent D is produced beforehand in a reservoir and is then introduced at ambient temperature in aqueous solution at a concentration between 0.1 and 20 g/liter and preferably 1 to 10 g/liter; it was observed that if this concentration is less than one gram/liter the results are not significant; likewise, if the concentration exceeds 20 g/l, the cost is needlessly increased without a proportional improvement;
- in practice, the mixture (F+D) is introduced at a temperature in the region of that of the vat in question;
- when the decantation is followed by several phases of washing the decanted material, the addition of the characteristic mixture may also be carried out from the first of the vats of the installation; the pumping efficiency for the transfer from one vat to another is thus increased, making it possible to increase the mineral concentration of the suspension, and ultimately to reduce the number of vats, and thus the investment;
- of the characteristic mixture of the invention is introduced relative to the amount of dry muds in a proportion of five to two thousand grams per tonne (5 to 2,000 g/t), preferably between twenty and four hundred grams per tonne (20 and 400 g/t) or between five and one hundred and fifty grams per tonne (5 and 150 g/t);
- the addition of the characteristic mixture (F+D) is carried out in the latter vats of the installation.

In a practical embodiment, the invention consists in introducing into at least one of the successive vats for washing and decanting the red muds, preferably in the latter vats, a mixture F+D comprising in equal proportions:
- an anionic polyacrylamide of molecular weight greater than ten million, preferably from 15 to 25 million;
- an acrylate of molecular weight less than fifty thousand, preferably from one thousand to ten thousand.

In a first embodiment, the characteristic mixture of flocculant (F) and of dispersing agent (D) is produced at the actual production site of these compounds and the mixture is then placed, in suitable amounts, in ready-to-use sacks.

In a preferred variant, the flocculant (F) placed in aqueous suspension and the emulsion of dispersing agent (D) are introduced together into the wash water supply pipe immediately beneath the mud sedimentation area.

The invention also relates to a device for introducing this mixture into a mud washing vat. In a simplified embodiment, this device comprises a supply pipe which penetrates into the solution contained in the vat in question, in the region of but just above the mud sedimentation area, in order to provide a monogeneous mixture with the washing solution.

In a preferred embodiment, the characteristic solution is sent into this supply pipe by a valve which is connected to the supply reservoir and controlled by an electronic means depending on the dosage and on the concentration of the supernatant washing water, and the solution is introduced annularly around a venturi at the center of which the mud solution to be treated in supplied.

BRIEF DESCRIPTION OF THE DRAWINGS

The manner in which the invention may be performed and the advantaged resulting therefrom will emerge more clearly from the production examples which follow, in support of the attached figures.

FIG. 5 is a representation in graph form which illustrates the advantages of the process of the invention.

DESCRIPTION OF THE INVENTION

Figure 1:
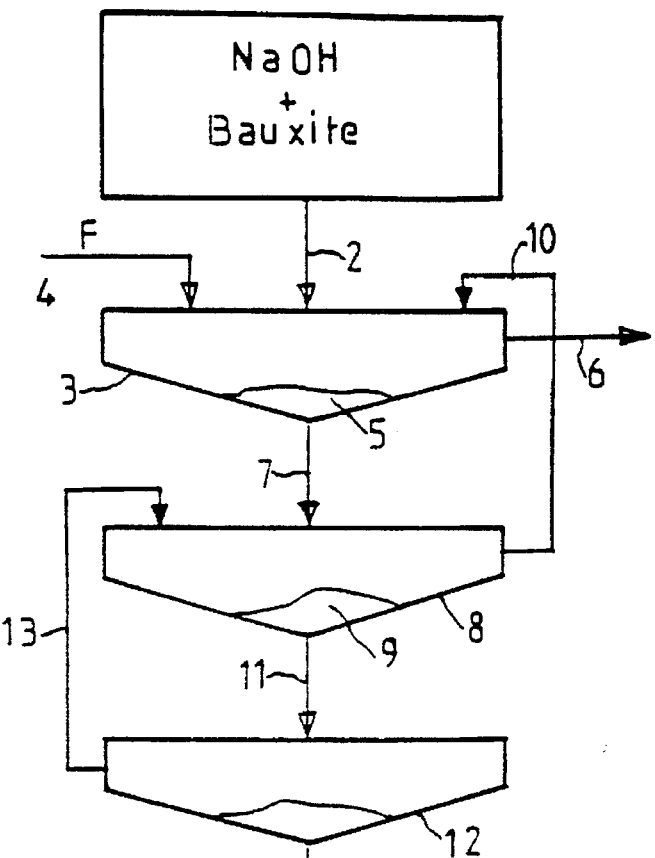
FIG. 1 is a schematic representation of a Bayer installation in accordance with the state of the art described in the document U.S. Pat. No. 4,169,824 targeted in the preamble.
Figure 1:
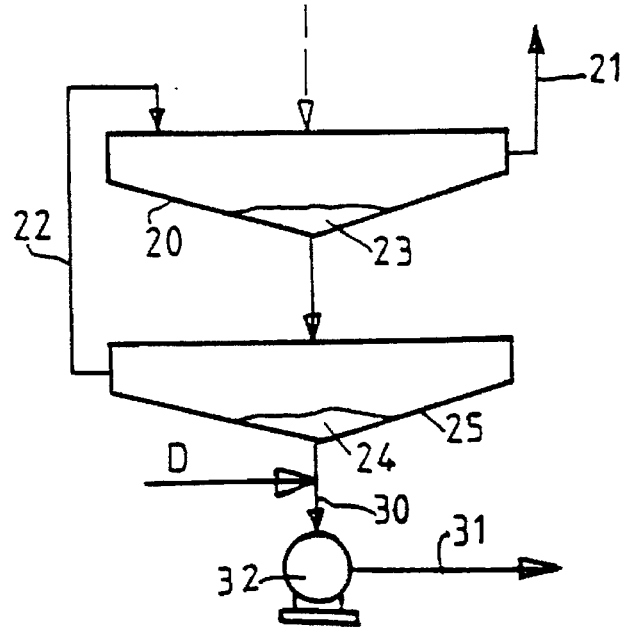

With reference to FIG. 1, the installation for the preparation of alumina by the standard Bayer process essentially consists of a reactor (1) into which a mixture of bauxite and sodium hydroxide having, for example, a sodium hydroxide concentration of 200 to 300 g/liter is introduced under pressure and at high temperature. The reaction product (2) is transferred to a decanter (3) to which is added, via the pipe (4), the anionic flocculant (F), for example at a concentration in the region of one hundred grams per tonne (100 g/t) of dry muds. The red muds (5) are then precipitated and the alumina is separated out at (6).

The solution (7) is subsequently pumped into a decanter (8) in order to complete the separation of the red muds (9). The sodium hydroxide-rich supernatant liquor (concentration in the region of 180 g/liter) is recycled at (10). The suspension of red muds (11) is subsequently transferred to another vat in series (12) and the supernatant liquor is recycled counter-current at (13). This process is repeated up to the final two vats (20,25) of the installation. References (21,22) denote the counter-current recycling circuit of the washing water, which are increasingly depleted in sodium hydroxide, and references (23,24) denote the red muds treated in this way.

The red mud-rich suspension (30) (concentration in the region of 600 g/l) obtained from the final vat (25) is, according to the teachings of the document U.S. Pat. No. 4,169,824, after addition of a dispersing agent (D), then sent into the elimination circuit (31) by virtue of a pump (32) and from there to the "lake".

In practice, the installation comprises seven to ten successive decantation vats (8, 12, 20, 25).

Figure 2:
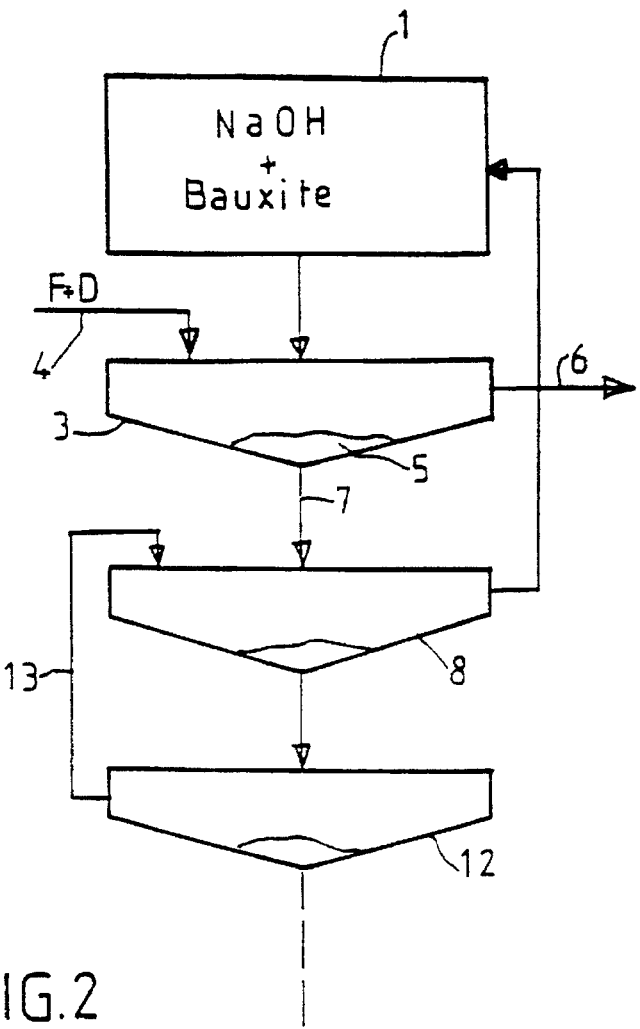
FIG. 2 is a schematic representation of the same installation which has been modified in accordance with the invention.
Figure 2:
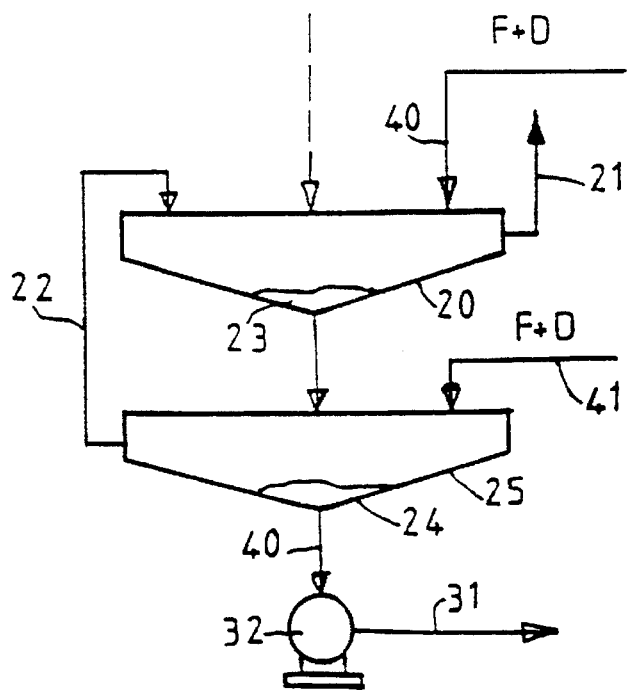

As it has already been stated, FIG. 2 illustrates the improvement according to the invention. This process consists, in the final or in the final two successive vats (20, 25), in introducing a mixture (F+D) of at least one specific flocculant (F) and at least one specific dispersing agent (D) into the washing waters. This mixture, denoted in FIG. 2 by the reference (F+D), may be introduced by any known means. According to the invention, there is no further introduction of dispersing agent (D) after the final vat (25), as shown in FIG. 1.

In one variant, the characteristic mixture (F+D) of polyacrylamide and acrylate may be introduced at the top, that is to say in the first vat (3).

Figure 3:
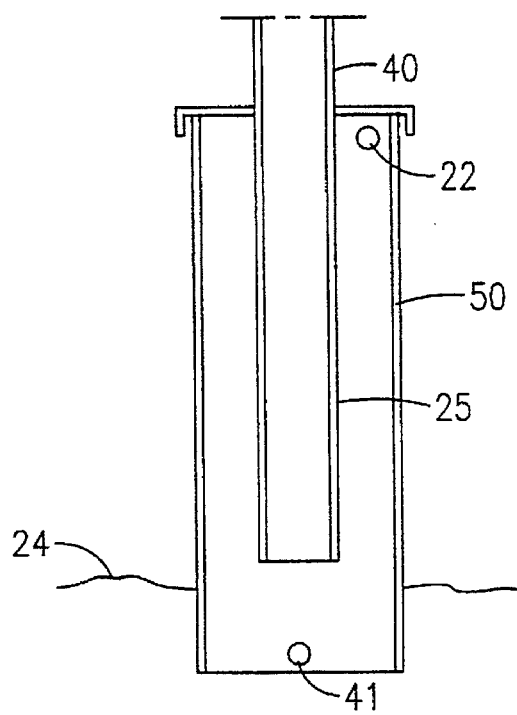
FIG. 3 is a representation of the preferred supply device of the invention, shown in detail in another embodiment in FIG. 4.

The introduction of the characteristic mixture F+D is effected (see FIGS. 3 and 4) using a supply pipe (50), connected to the mixture input pipe (40,41), which penetrates as deeply as possible into the vat concerned (25), preferably in the region of but above the sedimentation area of the treated muds (24). An homogeneous mixture is thus obtained.

It is important for the characteristic mixture F+D to be introduced at a temperature in the region of the temperature of the vats (20,25) in question, for example at a temperature between 30° and 40° C. If necessary, the mixture F+D may consequently be heated beforehand.

As above, the washing waters of the vat (25) containing the excess suspension from the preceding vat (20) and from the additional mixture introduced at (21) into the following vat (25) are recycled counter-current via the appropriate conduits (21, 22).

Figure 4:
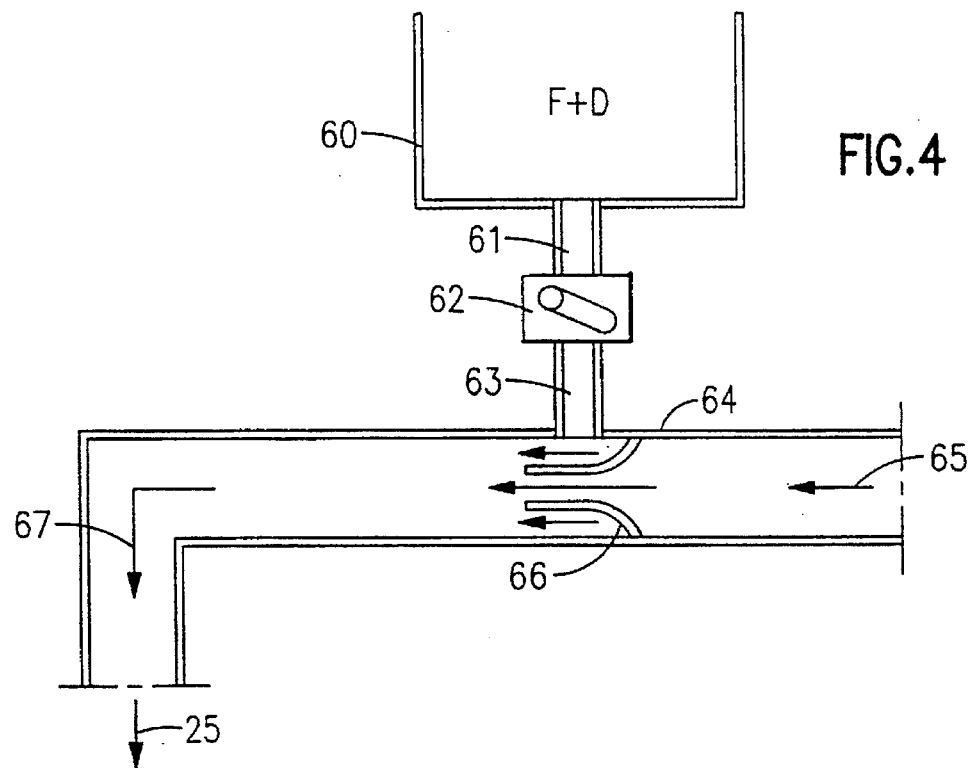

In the embodiment shown in FIG. 4, the mixture F+D is situated in a reservoir (60), connected via a pipe (61) to a valve (62), the opening of which is programmed as a function of the dosage of the suspension to be treated. This valve (62) is connected via a pipe (63) to the input conduit (64) of the red muds to be treated (65). To ensure mixing, the mud suspension (65) passes through a venturi (66) arranged at the level of the input pipe opening (63), in order to ensure that the system is blended well and to produce a homogeneous solution (67) which is poured into the following vat (25).

EXAMPLE 1

The usual teachings of the Bayer technique are reproduced on the installation of FIG. 1.

At the first vat (5), the amount of red muds is approximately 300 g/l and then increases gradually to 500 g/l in the penultimate vat (20), and is then 600 g/l in the final vat (25), for a Brookfield viscosity of 2,000 cps.

Into the first vat (3) are added, per tonne of dry muds, one hundred grams of a flocculant F formed of a linear anionic copolyacrylamide (100% anionic charges) marketed by the Applicant under the name "995".

The sodium hydroxide concentration decreases gradually from 200 g/l at the first vat to 50 g/l at the last (25).

The viscosity of the mud suspensions sent into the elimination circuit (31) is of the order of 9,000 cps, the concentration is in the region of 600 g/l, or even greater, and the sodium hydroxide content is of the order of 10 g/l.

In the table of FIG. 5, the abscissa gives the Brookfield viscosity in cps and the ordinate gives the shearing in revolutions per minute, measured using a Brookfield viscometer at rates of 6, 12, 30 and 60 revolutions per minute (r/min) with a No. 3 spindle and at room temperature. It is observed that, with the usual pumps (5 to 20 t/min), the viscosity of the muds to be conveyed is considerable and that, in order to obtain a satisfactory viscosity (2500 cps and lower), it is necessary to employ very powerful, sophisticated and expensive pumps, especially since the dimensions of the muds conveyed remain appreciable.

The results obtained are reported in FIG. 5 as a continuous line.

EXAMPLE 2

Example 1 is repeated, with the addition of a dispersing agent D between the outlet of the final decantation vat (25) and the pump (32) of the elimination circuit (31), according to the teachings of the document U.S. Pat. No. 4,169,824 cited in the preamble (FIG. 1).

An anionic sodium acrylate having a molecular weight of 2,000, marketed by the Applicant under the name "7", is used as dispersing agent (D). This agent (D) is introduced in a proportion of one hundred grams per tonne (100 g/t) of dry red muds.

It is observed that the initial viscosity is reduced from 9,000 to 8,500 cps.

If the concentration of dispersing agent (D) is increased, the viscosity is gradually brought to a floor of about 6,000 cps, for a concentration of the order of 1.5 kg/tonne. Beyond this, there is no further improvement.

Furthermore, the addition of dispersing agent causes a fall in the mud concentration, which has an effect on the economic interest of the process.

Finally, the greater the concentration of dispersing agent (D) introduced, the greater is the loss of efficiency of the pump (32).

The results obtained are reported in FIG. 5 as a dotted line.

EXAMPLE 3

Example 1 is repeated but with introduction into the first vat (3) of a mixture (F+D):

of the same flocculant (F), namely a 100% anionic copolyacrylamide, also in a proportion of one hundred grams per tonne (100 g/t) of dry red muds;

of the same dispersing agent (D) (anionic sodium acrylate) as in Example 2, also in a proportion of one hundred grams per tonne (100 g/t) of dry muds.

The viscosity of muds sent into the elimination circuit (31) is in the region of 3,000 cps and the dimensions of these muds are reduced. The results obtained are reported in FIG. 5 as a dot-and-dash line.

In this way, the rate or efficiency of the pump (32) may be increased and/or the number of vats may be reduced.

In other terms, less powerful pumps and narrower conduits may be employed, which substantially reduces the investment cost of the installation.

EXAMPLE 4

Example 3 is repeated, with replacement of the dispersing agent D by another sodium acrylate, but of molecular weight in the region of 5,000, sold by the Applicant under the name "8".

The first two viscosity values (6 and 12 rpm) are decreased from 3,000 to 2,800 and from 2,600 to 2,500, which facilitates the pumpability.

EXAMPLE 5

Example 3 is repeated, with replacement of the dispersing agent by a sodium acrylate marketed by IMDEX.

Analogous results are obtained.

As is seen, the process according to the invention improves the rate of decantation of the red muds in the various vats. It allows the concentration of the final red mud suspensions to decrease, while increasing the concentration of these suspensions in muds to be eliminated, without modification of the pumps or other existing equipment.

In this way, the process according to the invention is more efficient.

It also makes it possible to reduce the number of washing decanting vats and, as a consequence, to reduce the investment cost of the installation.

EXAMPLE 6

Example 3 is repeated by using:

as flocculant agent (F) a copolymer acrylamide/sodium acrylate 70% anionic, marketed by the Applicant with the brand-name 977 VHM, and;

as dispersant agent (D) a sodium acrylate having a molecular weight comprised between 3,000 to 5,000, marketed by HYCHEM with the brand-name HP1.

Analogous results as Example 3 are obtained.

We claim:

1. An improved process for fluidifying aqueous suspensions of red muds in the production of alumina from bauxite by the Bayer process, which comprises:

dissolving bauxite using sodium hydroxide and forming an aqueous suspension of red mud;

decanting and washing the red mud suspension in order to separate the red muds from the alumina in successive vats, while recycling a supernatent as washing water to a preceding vat;

eliminating the red muds thus treated;

the improvement comprising introducing simultaneously into the suspension and in the first of said successive vats a mixture comprising a flocculant (F) agent formed by an anionic polyacrylamide of molecular weight greater than ten million with a dispersing agent (D) formed by an anionic acrylic acid polymer of molecular weight lower than fifty thousand to decrease the viscosity and increase the concentration of the eliminated red muds, and wherein, in the mixture (F+D), the amount by weight of flocculant (F) relative to the amount by weight of dispersing agent (D) is between 0.1 and 5, and wherein the mixture of flocculant (F) and dispersing agent (D) is introduced at ambient temperature in aqueous suspension, at a concentration between 0.1 and 20 g/liter, in a proportion of 5 to 2000 grams/tonne of dry red mud suspension to be treated.

2. The process as claimed in claim 1, wherein the polyacrylamide F has an anionicity between 20 and 100 mol %.

3. The process as claimed in claim 1, wherein the flocculant F is a linear polyacrylamide copolymer or terpolymer.

4. The process as claimed in one of claim 1, wherein the dispersing agent (D) is a sodium polyacrylate of molecular weight between one thousand and ten thousand.

5. The process as claimed in claim 1, wherein the addition of the mixture of flocculant (F) and dispersing agent (D) is carried out in another second vat of said successive vats for decanting the red muds.

6. The process as claimed in claim 1, wherein the amount of the mixture introduced is between five and one hundred and fifty grams per tonne (5 to 150 g/t) of muds.

7. The process of claim 1 wherein the amount by weight of flocculant (F) relative to the amount by weight of the dispersing agent (D) is about 1.

8. The process of claim 1 wherein the mixture of flocculant (F) and dispersing agent (D) introduced at ambient temperature into the aqueous suspension is at a concentration of about 1 to 10 g/liter.

9. The process of claim 1 in which the amount of mixture introduced is between twenty and four hundred grams per tonne (20 to 400 g/t).

* * * * *